US012569840B2

(12) United States Patent
Dionne et al.

(10) Patent No.: US 12,569,840 B2
(45) Date of Patent: Mar. 10, 2026

(54) MULTICOMPONENT ALLOYED PLASMONIC PHOTOCATALYSIS

(71) Applicant: The Board of Trustees of the Leland Stanford Junior University, Stanford, CA (US)

(72) Inventors: Jennifer A. Dionne, Menlo Park, CA (US); Alan Dai, Palo Alto, CA (US); Briley Bourgeois, Mountain View, CA (US); Daniel K. Angell, San Francisco, CA (US); Dayne F. Swearer, Evanston, IL (US); Lin Yuan, Redwood City, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 411 days.

(21) Appl. No.: 18/196,359

(22) Filed: May 11, 2023

(65) Prior Publication Data

US 2023/0364597 A1    Nov. 16, 2023

Related U.S. Application Data

(60) Provisional application No. 63/340,588, filed on May 11, 2022.

(51) Int. Cl.
| | |
|---|---|
| *B01J 35/39* | (2024.01) |
| *B01J 23/44* | (2006.01) |
| *B01J 23/52* | (2006.01) |
| *B01J 35/00* | (2024.01) |
| *B01J 35/45* | (2024.01) |

(Continued)

(52) U.S. Cl.
CPC .............. *B01J 35/39* (2024.01); *B01J 23/44* (2013.01); *B01J 23/52* (2013.01); *B01J 35/19* (2024.01); *B01J 35/45* (2024.01); *B82Y 30/00* (2013.01); *B82Y 40/00* (2013.01)

(58) Field of Classification Search
None
See application file for complete search history.

(56) References Cited

U.S. PATENT DOCUMENTS

| | | | |
|---|---|---|---|
| 8,155,485 B2 | 4/2012 | Hyde | |
| 9,738,529 B2 * | 8/2017 | Huber | ...................... B01J 23/52 |

(Continued)

FOREIGN PATENT DOCUMENTS

WO    WO-2020124478 A1 *    6/2020    .............. B01J 35/45

OTHER PUBLICATIONS

Angell et al., "Lattice-Resolution, Dynamic Imaging of Hydrogen Absorption into Bimetallic AgPd Nanoparticles", ACS Nano 2022, 16, 2, 1781-1790.

(Continued)

*Primary Examiner* — John J Figueroa

(57) ABSTRACT

Improved photocatalysis is provided for chemical reactions involving hydrogen in two component plasmon-catalyst nanoparticles. The main idea of this work is to configure the optical illumination of the nano-articles to suppress formation of an undesirable hydride phase in the nanoparticles. This idea is broadly applicable to any chemical reaction involving hydrogen. Specific examples considered experimentally in this work are acetylene hydrogenation to produce ethylene, carbon dioxide reduction and ammonia synthesis.

9 Claims, 12 Drawing Sheets no illumination hydride phase forms catalysis inhibited

102

104

106 illumination hydride phase inhibited catalysis promoted

108

102

104

106

(51) Int. Cl.
    *B82Y 30/00*     (2011.01)
    *B82Y 40/00*     (2011.01)

(56)               References Cited

U.S. PATENT DOCUMENTS

| | | | |
|---|---|---|---|
| 10,766,024 B2 | 9/2020 | Halas | |
| 2015/0291434 A1* | 10/2015 | Huber | B01J 21/063 |
| | | | 204/157.47 |
| 2019/0046966 A1* | 2/2019 | Wang | C10G 2/35 |
| 2019/0255517 A1* | 8/2019 | Cure | B01J 21/063 |
| 2020/0206722 A1 | 7/2020 | Halas | |
| 2020/0269219 A1* | 8/2020 | Al-Ghamdi | C01B 3/042 |
| 2022/0193642 A1* | 6/2022 | Habib | C25D 5/10 |
| 2024/0199417 A1* | 6/2024 | Sastre Calabuig | B01J 23/52 |

OTHER PUBLICATIONS

Swearer et al., Advancing Plasmon-Induced Selectivity in Chemical Transformations with Optically Coupled Transmission Electron Microscopy. Acc. Chem. Res. 2021, 54, 19, 3632-3642. Sep. 7, 2021.

Vadai et al., "In-situ observation of plasmon-controlled photocatalytic dehydrogenation of individual palladium nanoparticles", 2018, Nature Communications | 9:4658 | DOI: 10.1038/s41467-018-07108-x.

* cited by examiner no illumination hydride phase forms catalysis inhibited

102

104

106

FIG. 1A illumination hydride phase inhibited catalysis promoted

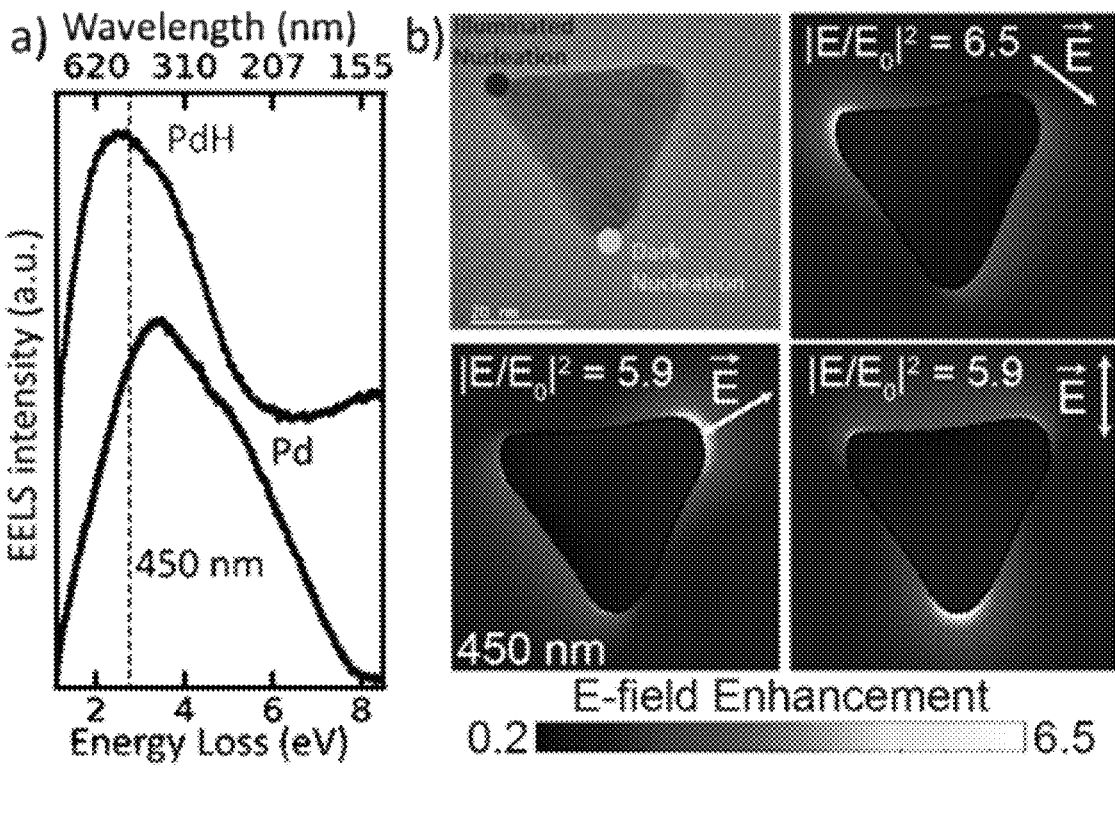
FIG. 3A                    FIG. 3B
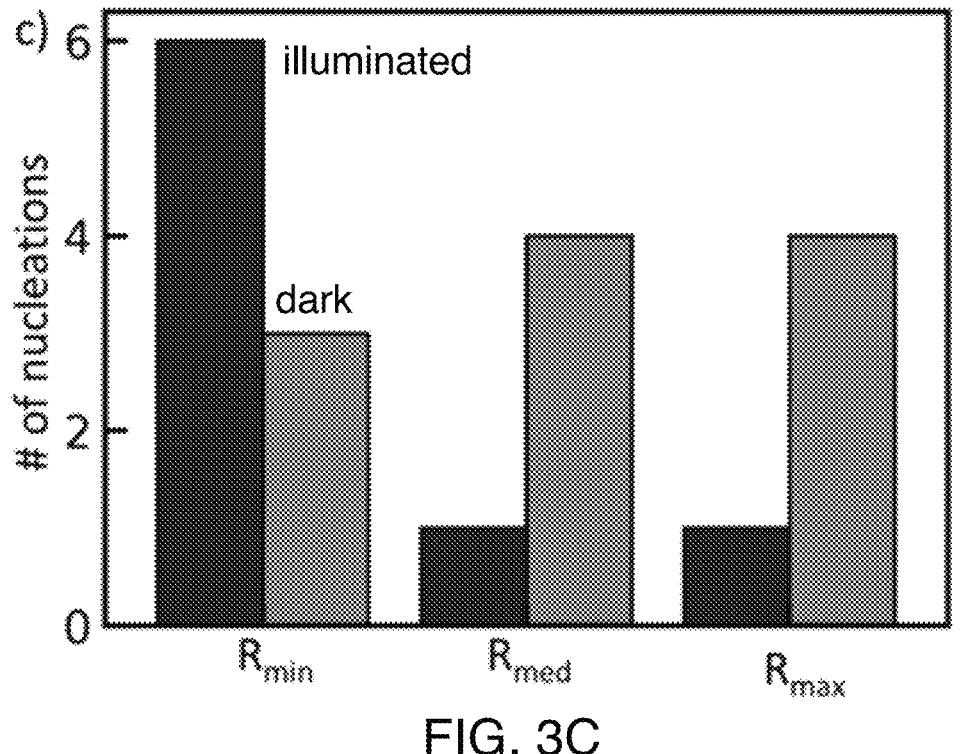
FIG. 3C

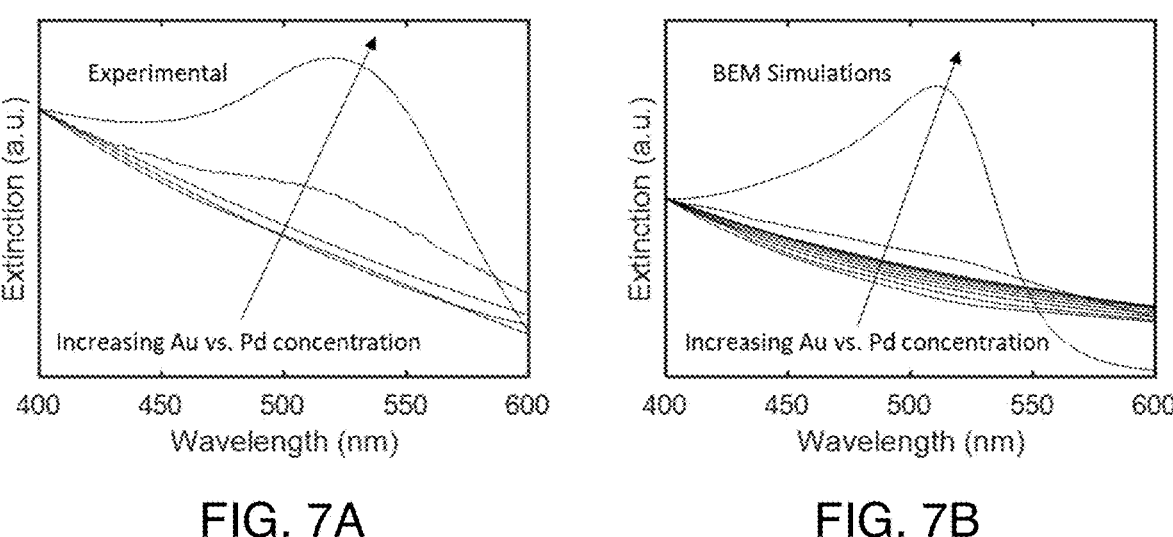
FIG. 7A                    FIG. 7B
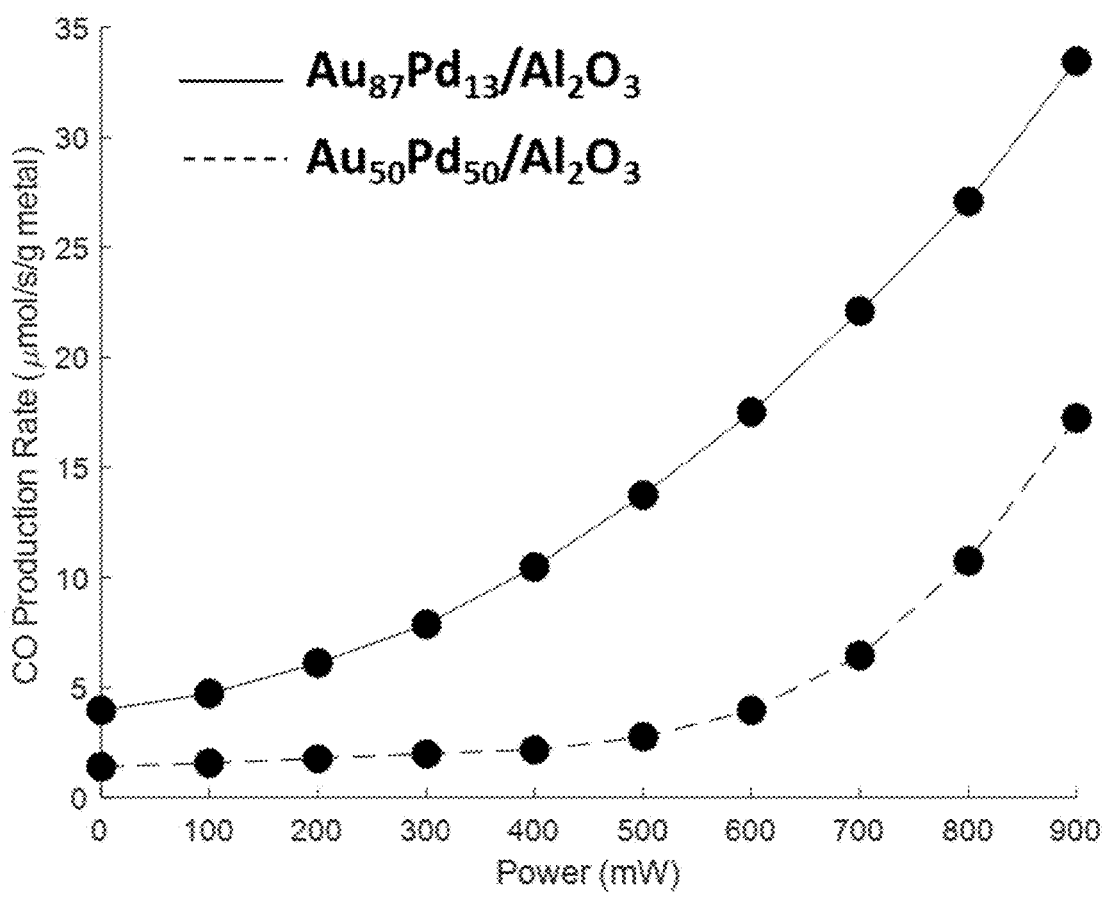
FIG. 8

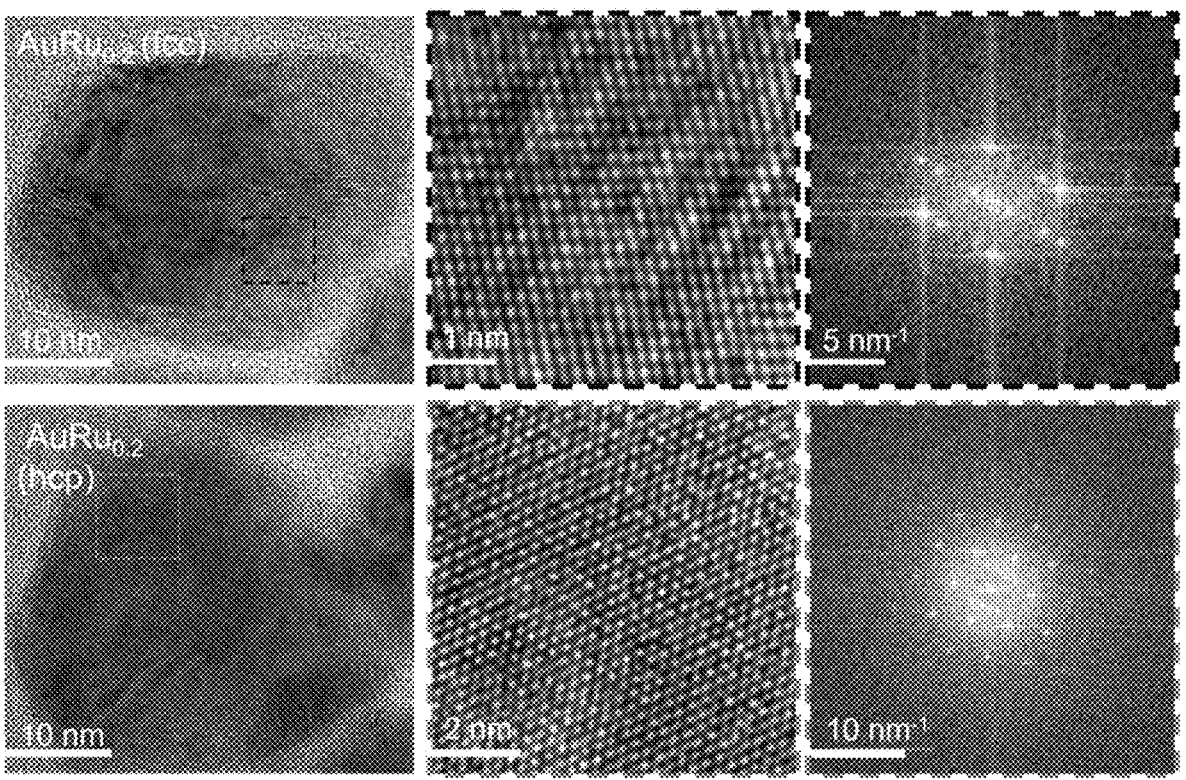
FIG. 13
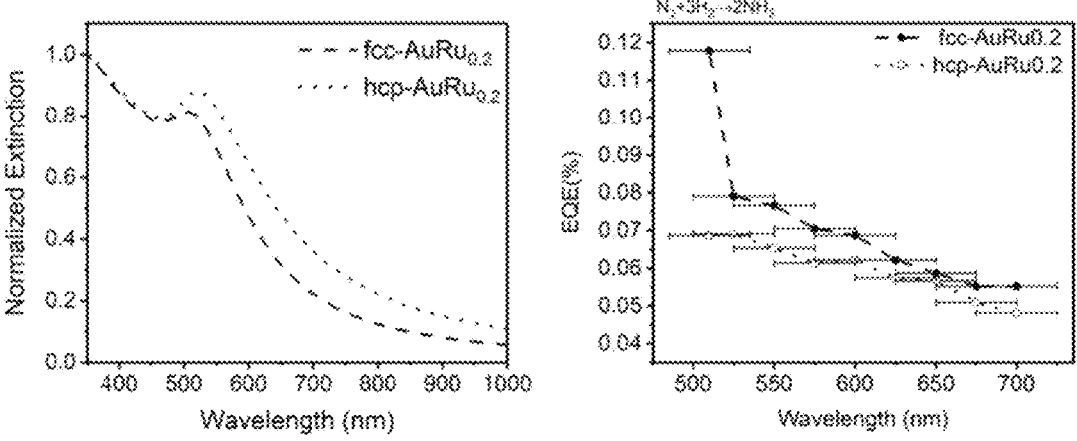
FIG. 14A                    FIG. 14B

MULTICOMPONENT ALLOYED PLASMONIC PHOTOCATALYSIS

CROSS REFERENCE TO RELATED APPLICATIONS

This application claims priority from U.S. Provisional Patent Application 63/340,588 filed May 11, 2022, which is incorporated herein by reference.

GOVERNMENT SPONSORSHIP

This invention was made with Government support under contract DGE-1656518 awarded by the National Science Foundation, under contract 1933624 awarded by the National Science Foundation, and under contract DE-AC02-76SF00515 awarded by the Department of Energy. The Government has certain rights in the invention.

FIELD OF THE INVENTION

This invention relates to catalysis of chemical reactions.

BACKGROUND

Metal nanoparticle catalysts help create many of the foods, medicines, and materials that underpin modern society. For example, the iron-based catalysts of the Haber-Bosch process produce ammonia for fertilizers and fibers; platinum nanoparticles catalyze the reforming of naphtha for gasoline; and palladium nanoparticles catalyze formation of plastics and pharmaceutical intermediates. Currently it is estimated that heterogeneous catalysts produce more than 80% of all chemical products in the world, and comprise up to 40% of the GDP, or approximately $30-35 trillion USD annually.

To overcome the activation barrier of various reaction steps, metal-nanoparticle-catalyzed reactions generally operate at high temperatures, achieved by burning petroleum fuels. This approach is not only associated with significant greenhouse gas emissions (ammonia synthesis alone accounts for 1.4% of global CO2 emissions), but also undesirable byproduct formation, necessitating significant additional energy to separate and purify products. Therefore, an overarching fundamental challenge is that increasing catalyst conversion rates often leads to the production of undesirable byproducts; while reactions happen more quickly, the yield of the desired product becomes smaller. Achieving precision chemistry, where reactions are simultaneously high-yield, product selective, and free from greenhouse-gas emissions, will be critical for a sustainable future.

SUMMARY

The present work addresses this critical problem by the use of an alloyed plasmonic photocatalyst composed of a combination of one strong light-interacting plasmonic material (e.g., Ag, Au, Cu, Al) as well as catalytically active metals (e.g., Pd, Pt) in which the plasmon resonance, or collective oscillation of conduction electrons in response electromagnetic radiation, is responsible for controlling the atomic rearrangements and molecular interactions of the catalytic material under reaction environments. In particular, we show that hydrogen absorbed within the crystal lattice of an alloy catalyst at its surface can be controlled via plasmon excitation, and this has a beneficial impact on the chemical reactivity of the material. Therefore, the present approach provides novel photo(electro)chemical catalysts that can control hydrogenation chemistry via optical control of hydride formation at the surface of the nanoparticle.

Embodiments of the invention can provide light-driven catalysts based on bimetallic alloyed nanoparticles that break the fundamental trade-off between selectivity and activity. Optical excitation of metallic nanoparticles results in plasmons—collective oscillations of the conduction electrons. Plasmons generate nanoscopically-controlled distributions of electrons, photons, and phonons, offering a chemical scalpel for sculpting reaction dynamics and mechanisms with orders of magnitude higher precision than conventional catalysis. The high energy electrons created by optical excitation at visible and ultraviolet frequencies not only expedites chemical reactions, but also unlocks entirely new, excited-state chemical pathways which are not accessible by traditional thermal catalysis. Moreover, light is a ubiquitous sustainable energy resource available from solar energy or modern high-efficiency LEDs powered by renewable electricity; therefore, light-driven reactions can contribute to the reduction of greenhouse gas emissions in photocatalytic reactions. In particular, embodiments include bimetallic alloyed nanoparticles with atomically-tuned concentrations of plasmonic metals (e.g., Ag, Au, CU, Al) as well as catalytically active metals (e.g., Pd, Pt). This combination enables solar-driven hydrogenation catalysts that are simultaneously selective and highly active.

A core design challenge of the system is the careful balancing of atomic composition with optical properties and inherent reactivity. By increasing the proportion of the catalyst made of the plasmonic component (Ag, Au, etc.), the optical properties are improved (i.e. stronger plasmonic resonance). Conversely, increasing the proportion of the opposing material (Pd, Pt, etc.) decreases the resonance, but increases the inherent reactivity. Under traditional thermal catalysis, such bimetallic alloys are common place. For hydrogenation catalysts and Pd-based materials in particular, the logic behind this design process is that the added material reduces the catalyst material's affinity for hydrogen absorption with the understanding being that absorbed hydrogen in the catalyst decreases the materials chemical selectivity. The trade-off of adding this secondary component is that it often serves as an inactive dilutant, increasing chemical selectivity at the sacrifice of reaction speed.

There is normally no consideration for optical properties, but our work demonstrates that the optical properties of these materials matter, and can control this unfavorable hydrogen absorption in addition to doping in this secondary element. In our system, the light-active component (e.g., Ag, Au, Cu) allows light absorption by the material which aids in the prevention of surface and sub-surface hydride formation. As such, the exact composition of the ideal photocatalyst requires further consideration than that of a catalyst driven by traditional thermal mechanism, and the use of light uniquely benefits the system.

We have extensively studied the process of hydrogen absorption in these bimetallic materials using atomic resolution electron microscopy with and without illumination. The results of FIG. 2 are representative of this work. Here we optically excite a corner dipole mode and the associated electric field enhancement drives hydrogen desorption preferentially to catalyst sites which have strongest field enhancement as opposed to a random site selectivity in the dark. This strongly suggests that we can control this detrimental hydride phase using light, instead of just alloying, and these results are the inspiration behind our catalyst design.

We have taken this fundamental discovery of light-controlled hydrogenation into several applicable new photocatalysts. The first reaction we considered was hydrogenation of acetylene into ethylene, a prerequisite reaction in the production of plastic and a $92 billion industry worldwide. Generally, reaction rates of Pd catalysts are increased by adding more H2, but this leads to the formation of unselective Pd-hydride and the undesirable byproduct, ethane. Therefore, the standard industry catalyst alloys Ag into Pd, to boost selectivity for ethylene; however, this alloying of Ag also sacrifices rates, since Ag is inactive for H2 splitting. In our research, we show that there is a synergistic effect in which adjusting the Ag component simultaneously alters the baseline catalyst performance and boosts the optical enhancement. We have developed a synthesis protocol for making bimetallic AgPd catalysts with tunable composition. These colloidal nanoparticles are loaded onto an Al2O3 support for proper gas phase catalytic testing.

These findings are independent of the exact synthesis methods used, or the exact supporting material used to host our bimetallic catalyst. A main novelty of our present approach is that plasmonic enhancement impacts the formation of hydride which subsequently impacts chemistry, and we expect to further tune catalyst nanostructure and utilize catalyst support materials that further aid in the utilization of light in the system. Examples include doping one or more optically active secondary elements including Au, Cu, or Al; supporting the catalytic system on chemically inert but optically active 3D architectures such as photonic crystals or metasurfaces; and controlling the shape of the individual catalyst such that the electric field of the corresponding plasmon is enhanced.

Additionally, we have applied this work for use in other chemistries, such as CO2 reduction and ammonia synthesis (both included in the examples described below). CO2 reduction is the holy grail of sustainable chemistry, and ammonia synthesis is another chemical reaction of paramount importance. The particles capture a different region of the solar spectrum and may show better reactivity for other important chemical reactions. The concept of using plasmon irradiation to control atomic structure and, thereby, chemical reactivity is novel and broadly applicable to hydrogen based catalysis.

This technology is broadly applicable to any heterogeneous catalysis involving hydrogen based chemistry. The system we developed may be substituted into existing ethylene production facilities to replace existing acetylene hydrogenation reactors. However, on-going work is targeting CO2 reduction, green steel manufacturing, and plastics upcycling.

There are two main benefits of this technology. The use of light as the primary energy input allows either the direct use of renewable energy via a solar-driven process, or the transformation of renewable based electricity into efficient LED illumination. Secondly, and critically, we show that light can control the underlying atomic structure of the material (intercalation of hydrogen) and that this has a direct impact on chemical reactivity. This key finding is what makes our technology unique in comparison with other work on plasmonic photocatalysis.

BRIEF DESCRIPTION OF THE DRAWINGS

FIG. 1A schematically shows inhibition of catalysis due to hydride phase formation in a catalyst nanoparticle.

FIG. 1B schematically shows promotion of catalysis due to suppression of hydride phase formation in a catalyst nanoparticle with optical illumination.

FIGS. 3-C show Electron energy loss spectroscopy (FIG. 3A), electromagnetic simulation (FIG. 3B), and phase transformation statistics (FIG. 3C) for Pd/PdH optical properties and transformation experiments.

FIGS. 7A-B show Experimental (FIG. 7A) and Simulated (FIG. 7B) UV-Vis spectra of AuPd nanoparticles.

FIG. 8 shows CO production from CO2 hydrogenation on two different AuPd alloy catalysts under illumination.

FIG. 13 shows HRTEM and FFT images of HCP and FCC AuRu nanoparticles.

FIGS. 14A-B show Extinction spectra (FIG. 14A) and photocatalytic external quantum efficiency (FIG. 14B) of AuRu0.2 under fcc and hcp phases with similar size distribution.

DETAILED DESCRIPTION

Figures 1C, 2:
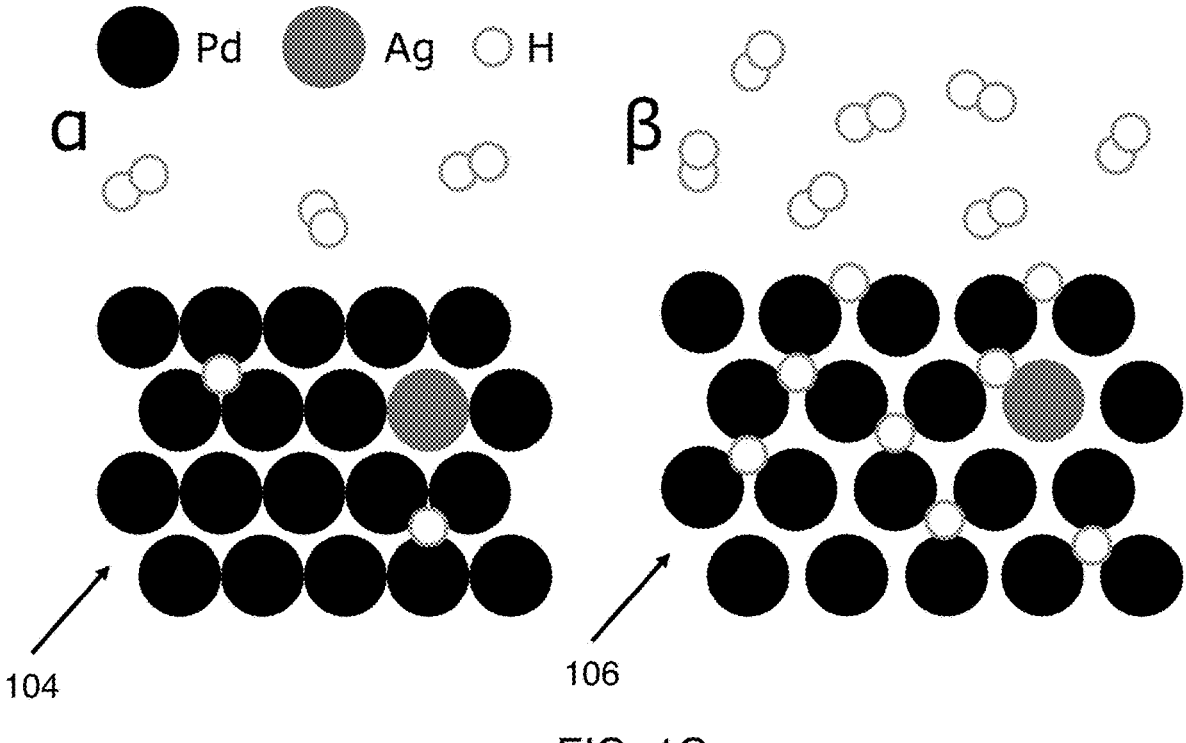
FIG. 1C schematically shows Pd/PdH phase transformations.
FIG. 2 shows TEM micrograph screenshots of an in-situ movie of Pd/PdH phase transformation in dark and light conditions.

FIGS. 1A-B schematically show principles relating to embodiments of the invention. In the situation of FIG. 1A, a catalyst nanoparticle 102 for a chemical reaction relating to hydrogen can often have its catalytic effect inhibited by formation of an undesirable hydride phase 106 on and/or within nanoparticle 102, which tends to reduce the fraction of nanoparticle 102 that is in the useful (i.e., non-hydride) phase 104.

We have found that under optical illumination 108, as schematically shown on FIG. 1B, formation of this undesirable hydride phase 106 can be inhibited, thereby promoting catalysis. The examples below generally relate to this concept, as applied to three exemplary chemical reactions—acetylene hydrogenation to produce ethylene, carbon dioxide reduction, and ammonia synthesis. These exemplary reactions all commonly have problems with catalyst efficiency we attribute to hydride phase formation in the catalysts, which we optically suppress to provide improved catalysis.

Pd/PdH phase transformations are known to impact the chemical reactivity and selectivity of catalyst. The schematic of FIG. 1C demonstrates the Pd ($\alpha$-phase 104) to PdH ($\beta$-phase 106) transformation, hydrogen gas uptake, and associated lattice parameter change. This phase transformation is the target of plasmon mediated structure modification for selective chemistry.

Our group has developed techniques to observe this phase change process inside of a transmission electron microscope. We have coupled laser excitation into the electron microscope to observe that this phase transition (i.e., $\beta$ to $\alpha$ or vice versa) can be induced by optically exciting a plasmon resonance on Pd and Pd-containing alloy nanoparticles. Light is able to control the structure of the catalyst ($\alpha$(Pd) vs ($\beta$(PdH)). We have shown that plasmon excitation on single plasmonic particles, which are amenable for colloidal synthesis and use in scaled chemical reactions, show light driven hydride transformations. FIG. 2 depicts the thermally-driven and light-driven transformation of a Pd particle in a hydrogen environment of 400 Pa within a transmission electron microscope. When the laser is off, hydrogen enters the lattice through one tip of the nanoparticle. The resulting phase change is easily observed as contrast within the particle. When the laser is turned on, hydrogen exits the particle through a different active site (the photoactive site) at much faster speeds (10× in this example) than the "dark" condition. The phase transformation (PdH→>Pd) is observed again as contrast in the formed TEM image, allowing us to observe the removal of hydrogen from the system and the transformation of the particle from the chemically unselective $\beta$(PdH) phase to the selective $\alpha$(Pd) phase.

In FIGS. 3A-C, we present statistical analysis of this transformation along with optical simulation of the nanoparticles probed. We find a statistically significant shift of the nucleation site for the growing Pd/PdH phase towards the sites of the particle with the greatest electric field enhancement, demonstrating that this effect is light-driven.

Figure 4A:
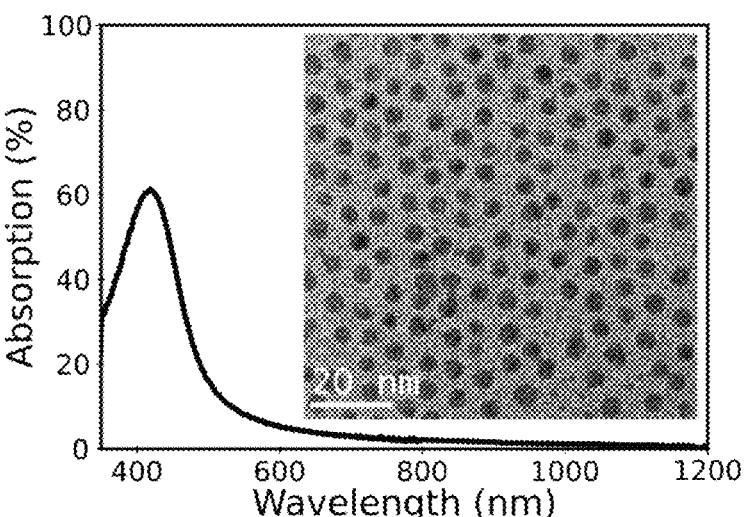
FIG. 4A shows a transmission electron micrograph of AgPd nanoparticles and the corresponding UV-Vis spectrum.
Figure 4B:
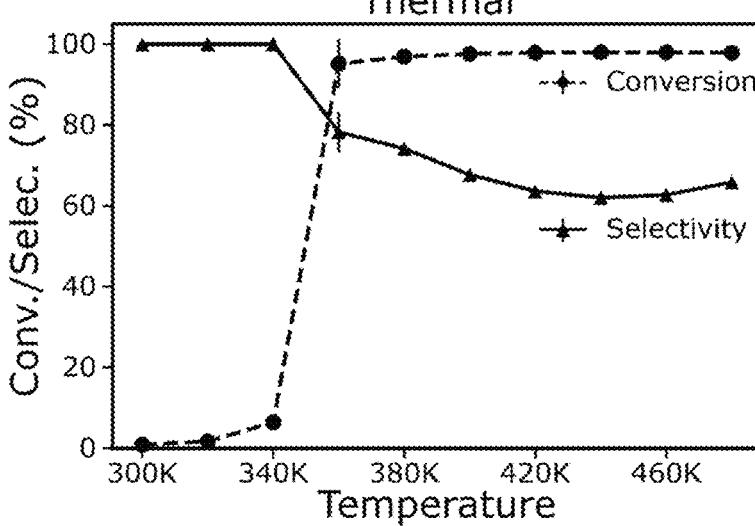
FIGS. 4B-C show thermal (FIG. 4B) and photo (FIG. 4C) reaction results for acetylene hydrogenation.
Figure 4C:
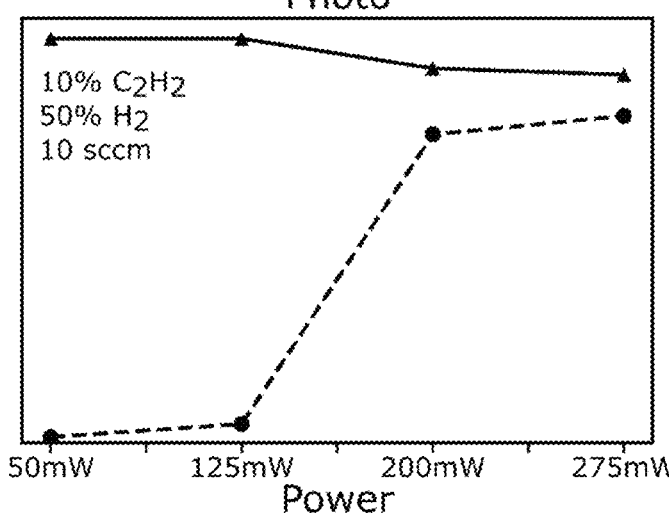

We have developed plasmonic, Pd-based alloy catalysts that show increased chemical selectivity under resonant laser illumination. This could be explained by chemical selectivity controlled via phase transitions in the material. FIG. 4A shows the transmission electron micrograph of bimetallic AgPd nanoparticles and the corresponding plasmon resonance from UV-Vis spectroscopy. In FIG. 4B, we show that there is a trade-off between chemical conversion and chemical selectivity when the acetylene hydrogenation reaction is run on these particles thermally. FIG. 4C shows that under identical conditions, this trade-off is lessened for the light-driven reaction under resonant laser illumination.

Figures 5A, 5B:
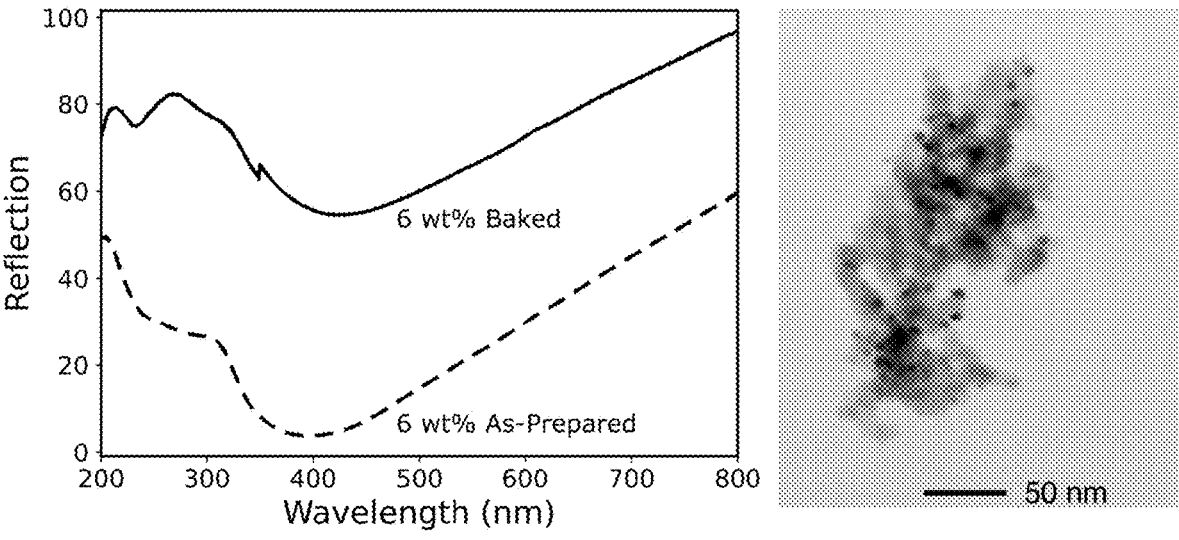
FIGS. 5A-B show UV-Vis spectrum (FIG. 5A) and scanning transmission electron micrograph (FIG. 5B) of AgPd nanoparticles loaded onto Al2O3 support

FIG. 5A shows alloy nanoparticles loaded onto $Al_2O_3$ support material possess a plasmon resonance before/after thermal treatment for ligand removal. These loaded nanoparticles are placed into a photoreactor system for testing. FIG. 5B is a corresponding electron microscope image.

Figure 6:
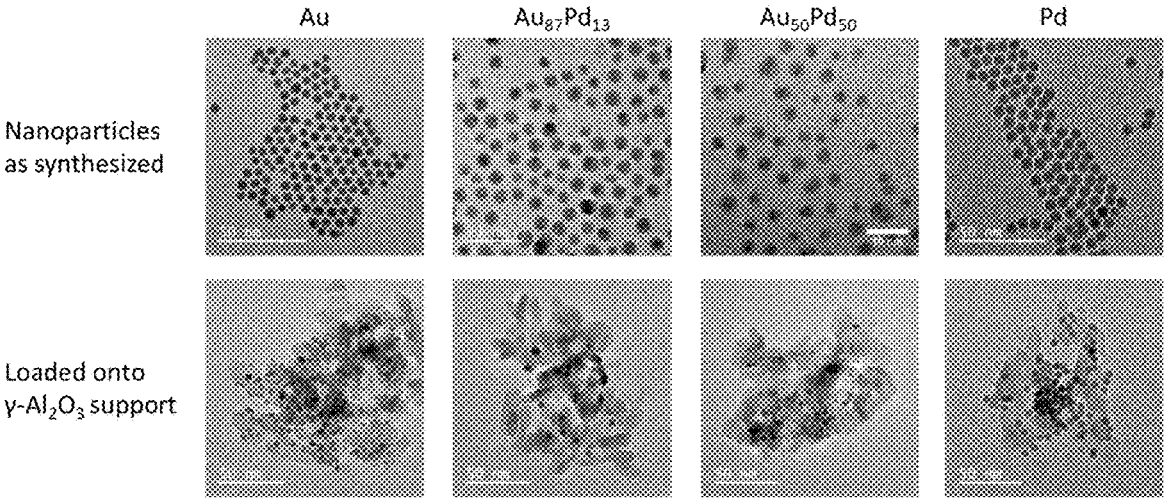
FIG. 6 shows transmission electron micrographs of AuPd nanoparticles as produced and loaded onto support material.

FIG. 6 shows we have synthesized ~5-nm spherical, bimetallic AuPd nanoparticles in a range of Au vs. Pd concentrations, which were then loaded onto $Al_2O_3$ support to form the final catalyst material. This figure shows transmission electron micrographs of these nanoparticles on an amorphous carbon background, demonstrating their monodispersity in size and shape. When deposited onto $Al_2O_3$ support, shown as the rough-edged flakes in the midground of the bottom row of images, the nanoparticles maintain their original shape while distributing evenly throughout the support material. These nanoparticles also show altered chemical properties under laser illumination.

FIG. 7A shows the optical properties of the bimetallic AuPd nanoparticles as characterized by UV-Vis spectroscopy. The figures show a series of normalized extinction spectra, varying with changing relative Au vs. Pd concentration in the nanoparticle, ranging from 100% Pd to 100% Au. The extinction coefficient monotonically increases in the visible range as Au content increases, indicating a stronger nanoparticle plasmon resonance. This behavior is both measured in experimental data and predicted by simulations calculated using boundary element methods (BEM), as shown on FIG. 7B.

The results of FIG. 8 show measured power-dependent photocatalytic activity of two different compositions of AuPd alloy catalysts to hydrogenate CO2 and selectively produce CO. The catalysts (AuPd nanoparticles loaded onto $Al_2O_3$) were heated to 700K and illuminated by 450-nm laser light at varying powers. Normalized to nanoparticle mass, the reaction rates are enhanced with a higher Au concentration in the catalyst. Since the two catalysts are of similar morphologies (as shown in FIG. 6), this difference in photocatalytic activity is likely due to the increased optical response of the higher-Au nanoparticles at a laser wavelength of 450 nm (as shown in FIGS. 7A-B), despite the lower amount of Pd which is an excellent hydrogenation catalyst.

Figure 9:
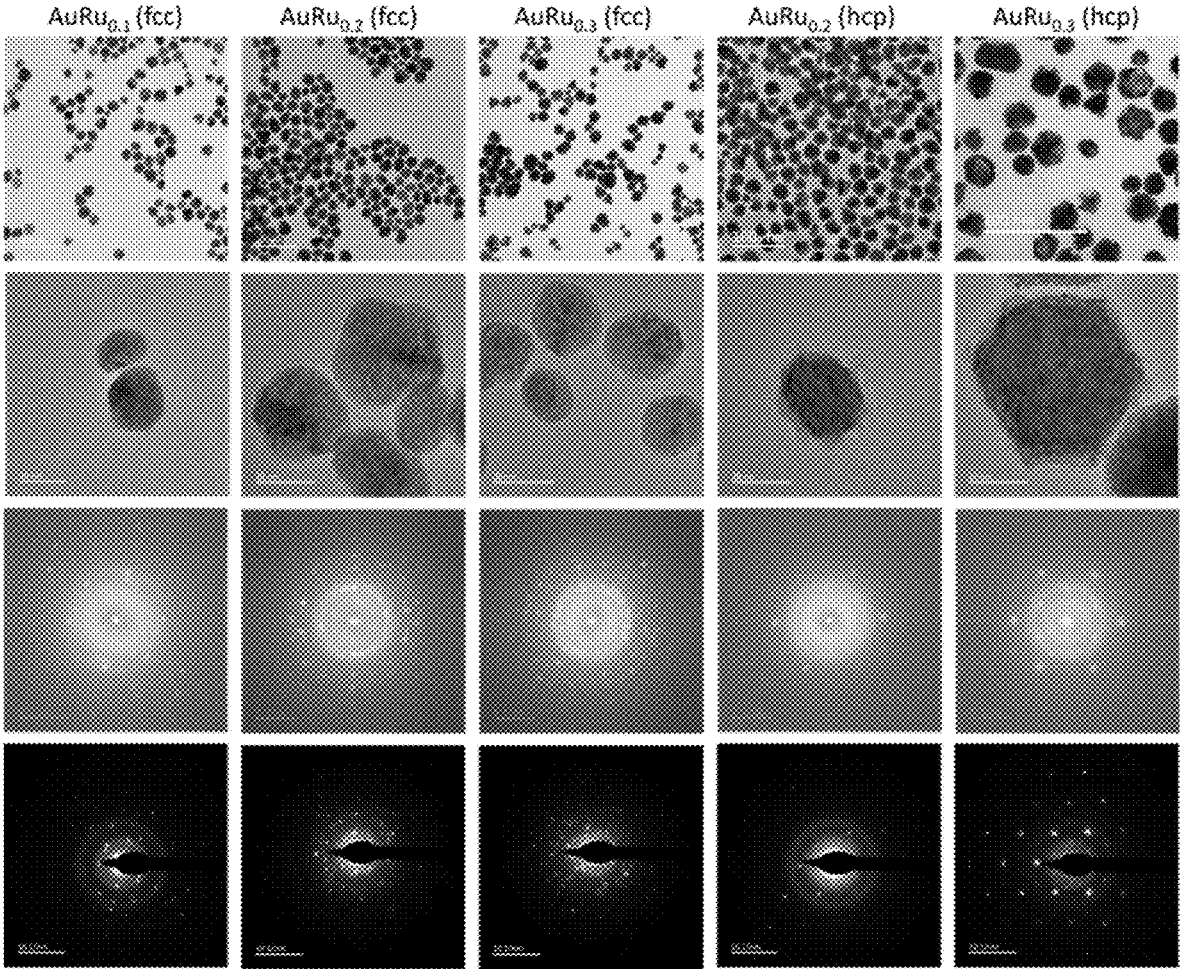
FIG. 9 shows TEM (first row), HRTEM (second row), FFT (third row), and SAED (fourth row) images of AuRu alloy nanoparticles.

FIG. 9 shows we have developed two types of AuRu bimetallic alloy with face-centered cubic (fcc) and hexagonal closed-packed (hcp) phases by polyol reduction method. From top to bottom rows: TEM, HRTEM (high resolution transmission electron microscopy), FFT (fast Fourier transform of the HRTEM images), and SAED (selected area electron diffraction) of the bimetallic alloy with the corresponding ratio and phase. The size of all the fcc AuRu and hcp AuRu0.2 are controlled to around 15-20 nm, and AuRu0.3 around 40 nm to achieve the similar optical properties. [1$\underline{1}$0], [111], and [220] facets are assigned on fcc nanoparticles; [002], [101], [2$\underline{1}$0] and [11$\underline{3}$] are assigned on hcp nanoparticles. The facets are from HRTEM, FFT and corresponding SAED.

Figure 10A:
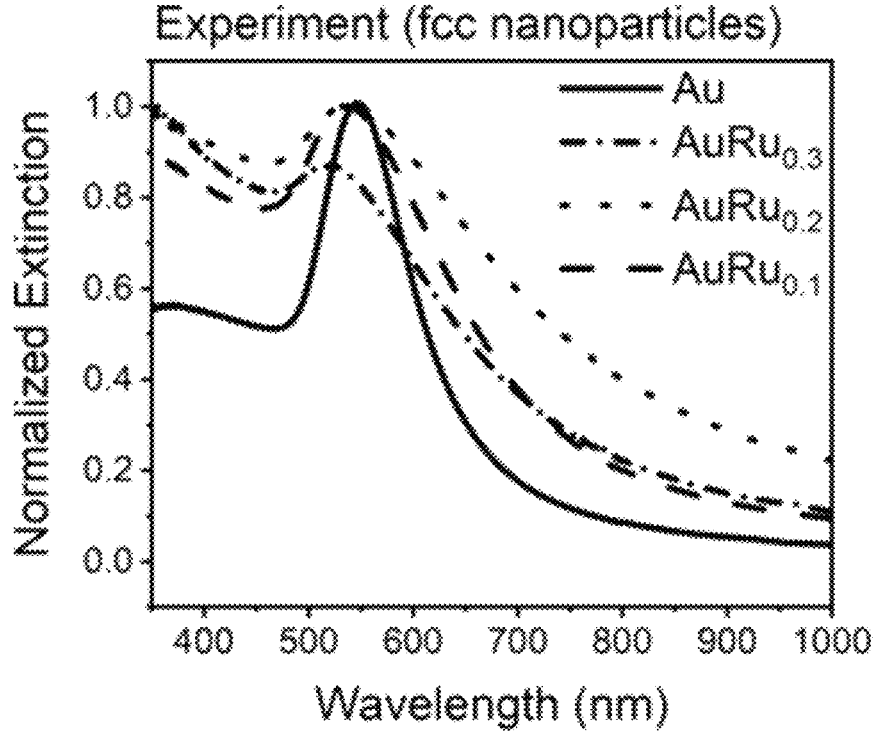
FIGS. 10A-B show Experimental (FIG. 10A) and Simulated (FIG. 10B) UV-Vis spectra of AuRu nanoparticles.
Figure 10B:
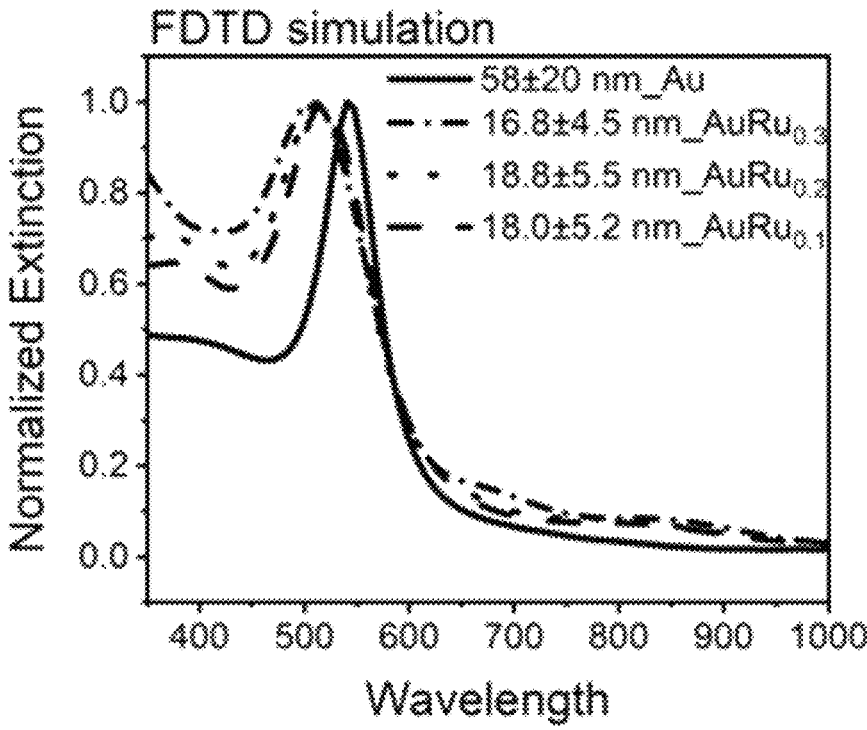

The measured optical properties of the fcc nanoparticles (FIG. 10A) can be fitted with the effective medium approximation (FIG. 10B). After simulating the dielectric constant of AuRu bimetallic alloy, the extinction spectra are calculated by finite-difference time-domain method. Peak positions and relative intensities match. We established the semi-classical theory to evaluate the optical properties and hot-carrier generation to correlate the wavelength-dependent reactivity to light-induced hot carriers.

Figure 11A:
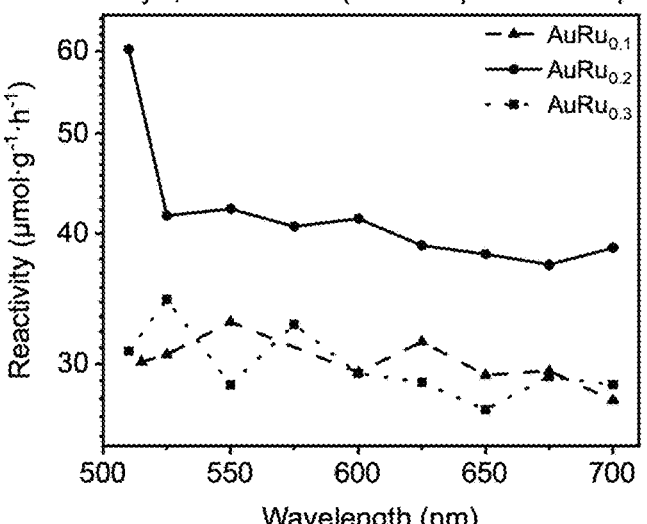
FIGS. 11A-C show experimental chemistry results of ammonia synthesis reaction on AuRu catalysts.
Figure 11B:
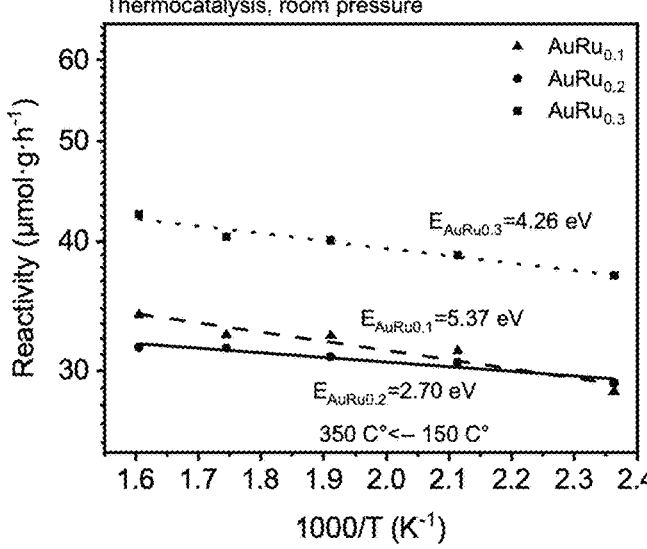
Figure 11C:
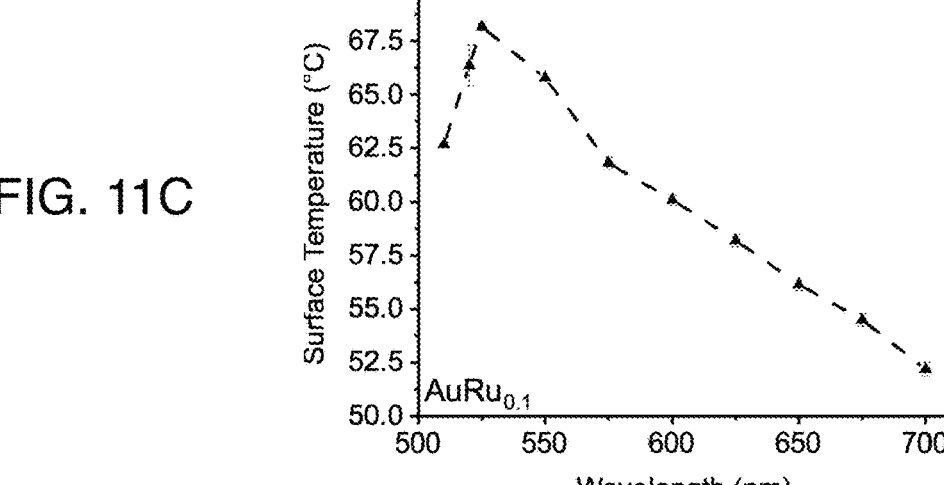

FIGS. 11A-C show ammonia synthesis results including: photocatalytic ammonia synthesis (FIG. 11A) at room temperature and pressure on fcc AuRu bimetallic alloy, thermocatalysis at room pressure (FIG. 11B), and the surface temperature (FIG. 11C) measured under 100 W/cm^2 light irradiation. We loaded the fcc AuRu0.1, AuRu0.2, and AuRu0.3 onto commercial MgO support by wet impregnation methods to make the catalyst bed. And flowing N2 and H2 gas with the ratio and total flow rate as 1:3 and 20 sccm. 100 mW/cm^2 super continuum laser at room temperature and pressure (25° C. and 1 atm) were applied. We observed 1.3 times better performance of photocatalysis at AuRu0.2 than heating the catalysts from 300-500° C. at room pressure. The IR camera showed the highest surface temperature is around 50-70° C.

Figure 12A:
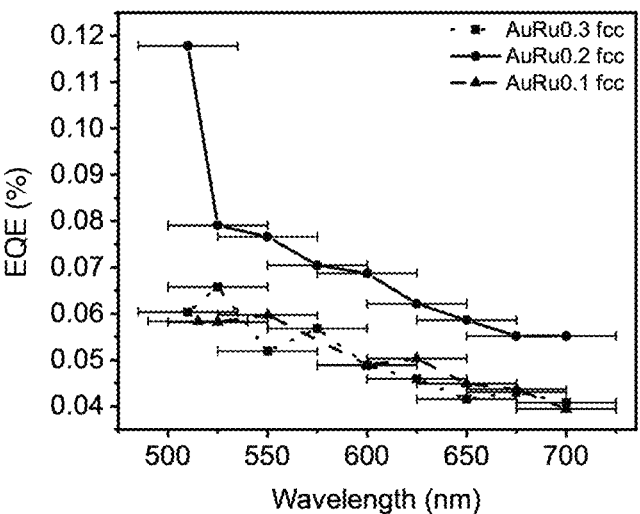
FIGS. 12A-C show Photocatalytic External Quantum Efficiency and theoretical hot-carrier cross-sections by Landau damping and interband transition.
Figure 12B:
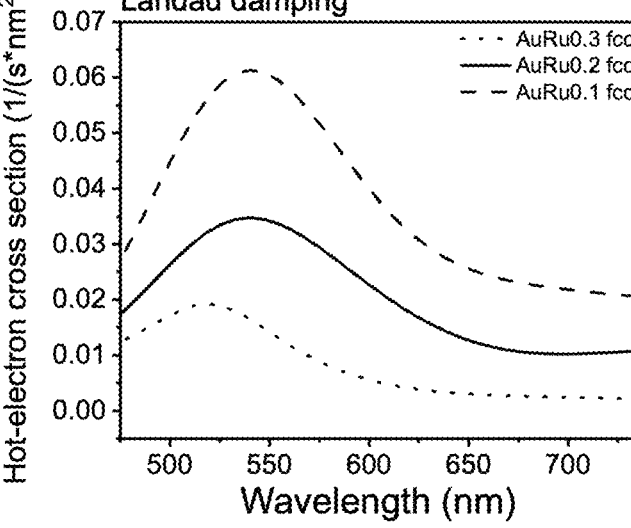
Figure 12C:
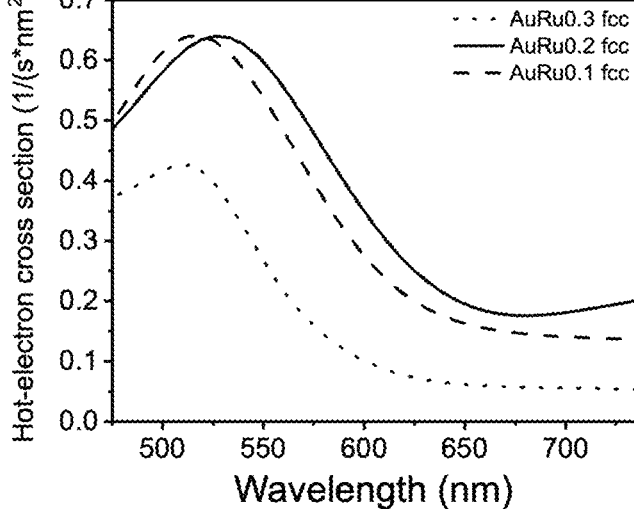

FIGS. 12A-C show photocatalytic external quantum efficiency (EQE, FIG. 12A), theoretical hot-carrier cross-sections by Landau damping (FIG. 12B) and interband transition (FIG. 12C) for AuRu photocatalysis. The external quantum efficiency represents the carrier transfer in chemistry divided by the numbers of photons. And the hot carrier generated though interband or landau damping are regarded as most promising candidate for those charge triggering chemistry. The EQE is intrinsically the product of mixing results of interband and landau-damping hot carrier. We can use the hot carrier generation as an input to simulate the effect of the AuRu with different ratio and size to evaluate and predict the performance of experiment.

FIG. 13 shows that Ru active sites can be engineered on the surface of alloy through phase and composition control, therefore potentially tuning the reactivity of ammonia synthesis. For these phase-controlled AuRu0.2 nanoparticles with similar sizes, TEM images are on the left, HRTEM images are in the middle and FFT images are on the right. We have the tool of the polyol reduction to do the phase control and eventually to tune the coordination environment and facets of Ru active sites to improve the catalytic performance.

FIGS. 14A-B show extinction spectra (FIG. 14A) and photocatalytic external quantum efficiency (FIG. 14B) of AuRu0.2 under fcc and hcp phases with similar size distribution for ammonia synthesis. We compared the AuRu0.2 fcc and hcp particles with similar size with the same weight loading on the MgO support. Intensities of external quantum efficiency and peak in wavelength-study are different for these two types of catalysts, so crystal structure may provide a knob to tune the behavior of the photocatalysts.

Figure 15:
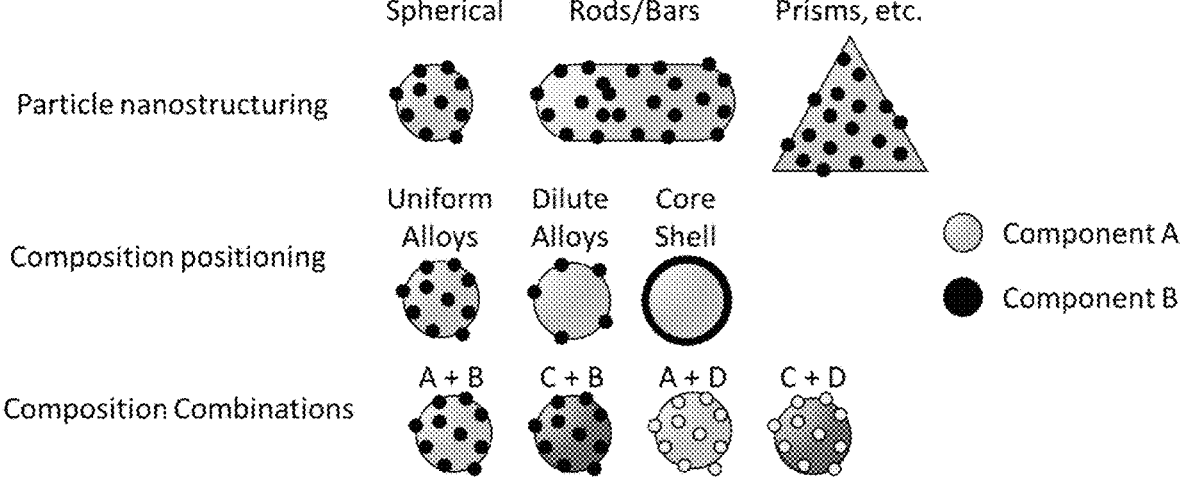
FIG. 15 is a schematic representation of alternative composite catalyst designs

FIG. 15 shows some examples of Multicomponent alloys including combinations of 2 or more of:

a) some plasmonic component (e.g. Au, Ag, Cu, Al, compound Nitrides)

b) with some typical catalyst (e.g. Ru, Rd, Pd, Pt, Ni, Fe).
Nanostructuring of such particles can include core/shell dilute alloys optically resonant geometries (bar, prism, star structures etc.)

Foreseeable next steps towards further development of this technology includes tweaking the compositions of the constituent materials to optimize selectivity and conversion under plasmonic excitation, non-composition related improvements for increasing the plasmonic response, and careful positioning of the catalytically reactive constituents such that rare material use is minimized and optical energy use is maximized. An overview of these direct future possibilities is outlined in FIG. 15. Geometric changes to particle morphology allows for precision tuning of the plasmon resonance, hence optical absorption, independent of alloy composition. The exact distribution of 1 or more constituent materials could be altered to better utilize the reactive species and improve optical properties, including homogenous alloys, core/shell structures, and diluted single atom alloys. Finally, many other materials compositions including 1 or more plasmonic components and 1 or more reactive components could be envisioned, including the case in which the plasmonic and reactive components are one and the same.

The preceding examples relate to elemental alloy compositions for the catalytic nanoparticles. It is also expected that the ideas of the present work are applicable in cases where the constituents of the nanoparticles are compounds (e.g., plasmonic nitride compounds) instead of elements. Thus in general the nanoparticles can have one or more plasmonic constituents and one or more catalytic constituents where optical illumination is used to suppress hydride phase formation as described herein, thereby improving catalytic performance. Such constituents can be any material (element(s) or compound(s)) having the defining properties (e.g., 'plasmonic' or 'catalytic').

The invention claimed is:

1. A method of catalyzing a chemical reaction, the method comprising:

illuminating catalyst particles with optical radiation; and providing chemical reactants to the catalyst particles, wherein the chemical reactants include hydrogen;

wherein the catalyst particles have a composition including a plasmonic constituent and a catalytic constituent;

wherein the optical radiation is configured to suppress formation of a hydride phase in the catalyst particles, whereby selectivity of the catalyst particles for the chemical reaction is improved.

2. The method of claim 1, wherein the composition further includes one or more additional plasmonic constituents.

3. The method of claim 1, wherein the composition further includes one or more additional catalytic constituents.

4. The method of claim 1, wherein the composition is configured to suppress formation of the hydride phase in the catalyst particles.

5. The method of claim 1, wherein the chemical reaction is reduction of carbon dioxide.

6. The method of claim 1, wherein the chemical reaction is synthesis of ammonia.

7. The method of claim 1, wherein the chemical reaction is acetylene hydrogenation to produce ethylene.

8. The method of claim 1, wherein the plasmonic constituent is selected from the group consisting of: Ag, Au, Cu, Al, and plasmonic nitride compounds.

9. The method of claim 1, wherein the catalytic constituent is selected from the group consisting of: Pt, Pd, Ru, Rd, Ni, and Fe.

* * * * *